United States Patent
Shibata et al.

(10) Patent No.: US 9,428,040 B2
(45) Date of Patent: Aug. 30, 2016

(54) ELECTRIC MOTOR MOUNTING STRUCTURE

(71) Applicant: HONDA MOTOR CO., LTD., Minato-Ku, Tokyo (JP)

(72) Inventors: Yasuyuki Shibata, Saitama (JP); Hirotomo Yamada, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/654,062

(22) PCT Filed: Sep. 12, 2013

(86) PCT No.: PCT/JP2013/005430
§ 371 (c)(1),
(2) Date: Jun. 19, 2015

(87) PCT Pub. No.: WO2014/097514
PCT Pub. Date: Jun. 26, 2014

(65) Prior Publication Data
US 2016/0129774 A1    May 12, 2016

(30) Foreign Application Priority Data
Dec. 21, 2012  (JP) ................................. 2012-278916

(51) Int. Cl.
*B60K 1/00*    (2006.01)
*B62D 25/08*    (2006.01)

(52) U.S. Cl.
CPC .............. *B60K 1/00* (2013.01); *B62D 25/082* (2013.01)

(58) Field of Classification Search
CPC ............ B60K 1/00; B60K 6/20; B60K 6/22; B60K 6/26
See application file for complete search history.

(56) References Cited

U.S. PATENT DOCUMENTS

| | | | | |
|---|---|---|---|---|
| 2,495,573 A | * | 1/1950 | Duke | A61G 5/047 180/11 |
| 3,190,387 A | * | 6/1965 | Dow | B60K 1/00 180/65.1 |
| 3,566,985 A | * | 3/1971 | Triplett | B60K 1/00 180/214 |
| 3,845,835 A | * | 11/1974 | Petit | B60K 1/00 180/65.31 |
| 3,937,291 A | * | 2/1976 | Hanagan | B60K 1/00 180/220 |
| 3,972,380 A | * | 8/1976 | Hudson | B60K 1/00 180/65.25 |
| 5,372,216 A | * | 12/1994 | Tsuji | B60G 99/00 180/274 |
| 6,439,331 B1 | * | 8/2002 | Fan | B62D 21/12 180/208 |
| 8,479,868 B2 | | 7/2013 | Wakatsuki et al. | |

(Continued)

FOREIGN PATENT DOCUMENTS

| JP | H07-277005 A | 10/1995 |
|---|---|---|
| JP | 2004-345610 A | 12/2004 |

(Continued)

*Primary Examiner* — Erez Gurari
(74) *Attorney, Agent, or Firm* — Carrier Blackman & Associates, P.C.; Joseph P. Carrier; William D. Blackman (57) ABSTRACT

The stiffness in supporting an electric motor is increased in an electric motor mounting structure for mounting an electric motor for driving the wheels on the vehicle body. In an electric motor mounting structure for mounting an electric motor (60) for driving a wheel on a vehicle body (1) formed by combining a plurality of frame members, the electric motor is mounted on one of the frame members (front middle cross member) (43) via a first mount member (front mount member) (71), the one frame member is provided with a receiving hole (101), and at least a part of the first mount member projects into the receiving hole.

6 Claims, 9 Drawing Sheets

(56) References Cited

U.S. PATENT DOCUMENTS

| | | | |
|---|---|---|---|
| 9,283,837 B1* | 3/2016 | Rawlinson | H02K 5/04 |
| 9,302,723 B1* | 4/2016 | Pollitzer | B62D 63/025 |
| 2010/0101885 A1* | 4/2010 | Nozaki | B60K 1/00 180/232 |
| 2011/0132672 A1* | 6/2011 | Niina | B60K 1/00 180/60 |
| 2011/0162902 A1* | 7/2011 | Dobbins | B60R 25/00 180/68.5 |
| 2012/0031689 A1* | 2/2012 | Kanno | B60K 1/00 180/65.1 |
| 2012/0055721 A1* | 3/2012 | Matano | B60K 1/04 180/65.1 |
| 2012/0145467 A1* | 6/2012 | Wakatsuki | B60K 1/00 180/54.1 |
| 2012/0160590 A1* | 6/2012 | Wakatsuki | B62D 21/11 180/291 |
| 2012/0211298 A1* | 8/2012 | Tachibana | B60K 1/00 180/291 |
| 2012/0292124 A1* | 11/2012 | Yamashita | B62D 21/155 180/291 |
| 2013/0118820 A1* | 5/2013 | Yokoyama | B60H 1/00385 180/65.1 |
| 2013/0119704 A1* | 5/2013 | Amano | B60K 1/00 296/187.1 |
| 2013/0119758 A1* | 5/2013 | Takamatsu | B60L 11/1868 307/9.1 |
| 2013/0126252 A1* | 5/2013 | Suzuki | B60K 1/00 180/53.1 |
| 2013/0139626 A1* | 6/2013 | Agnew | B60L 11/00 74/325 |
| 2015/0122561 A1* | 5/2015 | Kashiwai | B60K 1/00 180/65.6 |
| 2015/0283889 A1* | 10/2015 | Agnew | B60K 1/00 180/292 |
| 2015/0360548 A1* | 12/2015 | Merkel | B60K 1/00 180/291 |
| 2015/0360549 A1* | 12/2015 | Merkel | B62D 21/11 180/65.1 |
| 2015/0375622 A1* | 12/2015 | Yamanaka | B60K 1/00 180/65.1 |
| 2015/0375783 A1* | 12/2015 | Yamamoto | B60K 1/00 180/253 |

FOREIGN PATENT DOCUMENTS

| | | |
|---|---|---|
| JP | 2005-280647 A | 10/2005 |
| JP | 2011-189790 A | 9/2011 |
| JP | 2012-126168 A | 7/2012 |
| JP | 2013-112181 A | 6/2013 |

* cited by examiner

ELECTRIC MOTOR MOUNTING STRUCTURE

TECHNICAL FIELD

The present invention relates to an electric motor mounting structure for mounting an electric motor for driving a wheel of a motor vehicle on a vehicle body.

BACKGROUND ART

In a known mounting structure for mounting an electric motor for driving wheels on a vehicle body, a cross member connects a pair of front side frames (front side members) extending in the fore and aft direction to each other, and an electric motor is supported by this cross member (See Patent Document 1, for instance). In this mounting structure, each end of the cross member is attached to the corresponding front side frame via a bracket which is fastened to the front side frame and a damper housing (suspension tower) by threaded bolts. The bracket is provided with a projecting part projecting in the inboard direction from the corresponding front side frame, and the corresponding end of the cross member is attached to this projecting part of the bracket by threaded bolts.

PRIOR ART DOCUMENT(S)

Patent Document(s)

[Patent Document 1] JP2011-189790A

SUMMARY OF THE INVENTION

Task to be Accomplished by the Invention

The electric motor that drives the wheels receives a reaction from the road surface via the wheels and the drive shaft in operation. Therefore, the structure for supporting the electric motor is required to have an adequate stiffness to withstand the moment (torque) that is produced by the electric motor. In particular, it is important to heed the fact that a relatively large moment is applied to the bonded part (the mounting portion) between the electric motor and the cross member.

The present invention was made in view of such problems of the prior art, and has a primary object to increase the stiffness in supporting an electric motor in an electric motor mounting structure for mounting an electric motor for driving the wheels on the vehicle body.

Means to Accomplish the Task

To accomplish such a task, the present invention provides an electric motor mounting structure for mounting an electric motor (60) for driving a wheel on a vehicle body (1) formed by combining a plurality of frame members, wherein: the electric motor is mounted on one of the frame members (43) via a first mount member (71); the one frame member is provided with a receiving hole (101); and at least a part of the first mount member projects into the receiving hole.

According to this arrangement, because the first mount member projects into the cross section of the corresponding frame member, the overlap (engagement) between the first mount member and the frame member is maximized, and the bonding strength between them is increased. As a result, a localized excessive stress in the bonded part between the first mount member and the frame member is avoided, and the moment produced by the electric motor is effectively supported. This also allows the use of a high output electric motor.

In this invention, it may also be arranged such that the first mount member includes a first outer tube member (91) partly received by the receiving hole, a first fastening portion (92) projecting from an outer surface of the first outer tube member and fastened to the one frame member at a part thereof outside of the receiving hole by a first threaded bolt (104), and a first inner tube member (94) retained inside the first outer tube member via a rubber member (93) and joined to a member on the side of the electric motor, and a collar (103) for receiving and supporting the first threaded bolt is joined to the one frame member.

According to this arrangement, the stiffness of the part of the frame member surrounding the receiving hole can be increased by providing the collar on the outer part of the collar. Also, because the first mount member is fastened to the frame member at the first fastening portion via the collar and the first threaded bolt, the length of the part of the first outer tube member received in the receiving hole can be adjusted by changing the axial length of the first outer tube member.

In this invention, it may also be arranged such that the first inner tube member is joined to the member (70) on the side of the electric motor by a second threaded bolt (98), and the receiving hole consists of a through hole, the first and second threaded bolts having a same threading direction.

According to this arrangement, the first fastening portion may be fastened to the frame member from the same direction as fastening the first inner tube member to the member on the side of the electric motor, and this facilitates the assembly work. In particular, when the receiving hole consists of a through hole, because the first inner tube member is exposed from the receiving hole, the fastening directions of the first threaded bolt and the second threaded bolt may be coincided.

In this invention, it may also be arranged such that the frame members include a pair of side members (6) extending in a fore and aft direction on either side, a first cross member (43) extending laterally and joined to the side members, and a second cross member (26) extending laterally behind the first cross member, and the electric motor is provided with a rotary shaft (60A) extending laterally and located between the first cross member and the second cross member with respect to the fore and aft direction, a front part supported by the first cross member via the first mount member, and a rear part supported by the second cross member via a second mount member.

According to this arrangement, because the electric motor having a laterally extending rotary shaft can be supported by the first cross member and the second cross member which are positioned in front of and behind the electric motor, respectively, the electric motor can be supported in a stable manner against the moment acting upon the electric motor. Therefore, a high output electric motor can be used without any problem.

In this invention, it may also be arranged such that the second mount member includes a second inner tube member (114) supporting the electric motor, a second outer tube member (111) receiving the second inner tube member via a rubber member (113), and a second fastening portion (112) projecting from an outer surface of the second outer tube member and fastened to the second cross member by a third threaded bolt (122), the third threaded bolt having an axial line substantially perpendicular to an axial line of the second inner tube member, and the second mount member is fastened to the second cross member by passing the third threaded bolt therethrough from below.

According to this arrangement, because the second mount member is positioned below the second cross member, the rear part of the electric motor may extend under the second cross member so that the space may be efficiently utilized, and the vehicle body may be designed in a compact manner.

In this invention, it may also be arranged such that a tunnel frame (43) extending in the fore and aft direction with an upward slant toward a front end (43A) thereof is joined to a rear part of the second cross member at a front end thereof, and the second fastening portion is fastened to the tunnel frame by a fourth threaded bolt (127).

According to this arrangement, because the stiffness of the second cross member is increased by the tunnel frame, the stiffness in supporting the electric motor can be increased. Also, because some space is defined under the second cross member and the front end of the tunnel frame, efficient utilization of space is enabled by positioning the rear end of the electric motor, and the vehicle body can be designed in a compact manner.

In this invention, it may also be arranged such that a front part of the electric motor is joined to a pair of motor stay members (70) that extend forward while diverging away from each other laterally, and front ends of the motor stay members are supported by the first cross member via the respective first mount members.

According to this arrangement, the lateral space between the first mount members can be maximized so that the stability in supporting the electric motor can be increased. Because the first mount members are positioned on the lateral end sides of the first cross member (adjacent to the corresponding side members), the first mount members are supported by relatively stiff parts of the first cross member.

In this invention, it may also be arranged such that at least three said first fastening portions are provided, and at least two of the first fastening portions are provided on one side of the center of the first outer tube member adjoining the corresponding side member.

According to this arrangement, because the first mount members are positioned on the lateral end sides of the first cross member (adjacent to the corresponding side members), the first mount members are supported by relatively stiff parts of the first cross member.

In this invention, it may also be arranged such that an imaginary line connecting the first mount member and the second mount member passes through a housing of the electric motor as viewed in a lateral direction.

According to this arrangement, because the rotary shaft of the electric motor is positioned close to the imaginary line connecting the first mount member and the second mount member, the stiffness in supporting the electric motor by the first cross member and the second cross member can be increased.

Effect of the Invention

According to the arrangements of the present invention, the stiffness in supporting an electric motor can be increased in an electric motor mounting structure for mounting an electric motor for driving the wheels on the vehicle body.

DESCRIPTION OF THE PREFERRED EMBODIMENT(S)

A vehicle body incorporated with a structure embodying the present invention is described in the following with reference to the appended drawings. The vehicle body 1 is applied to a four-wheeled vehicle. In the following description, the forward direction coincides with the forward traveling direction of the vehicle body, and the left and right, and the up and down are defined with respect to the vehicle body directed in the forward direction (See FIG. 1).

The various components that are used for forming the vehicle body 1 (such as front side frames 6 which will be described hereinafter) and are going to be discussed in the following consist of stamp formed (from roll formed stock) members, extruded members and cast members made of materials such as steel and aluminum alloy unless otherwise specified. Each component may also be formed by joining stamp formed members, extruded members and cast members together. When a component is made of a member having a closed cross section (with respect to a cross section perpendicular to the lengthwise direction), the component may consist of a tubular or pipe member, a stamp formed member given with a closed section by bonding together a plurality of pieces or an extruded member given with a closed cross section at the time of the extrusion process. The work defined by the term "bond" or "join" as used herein may be performed by any per se known bonding means including, not exclusively, welding such as spot welding, arc welding (TIG and MIG welding) and laser welding, fastening such as threaded bolts and SPR (self-piercing riveting), friction stir welding, and bonding agents.

(Front Structure of the Vehicle Body)

Figure 1:
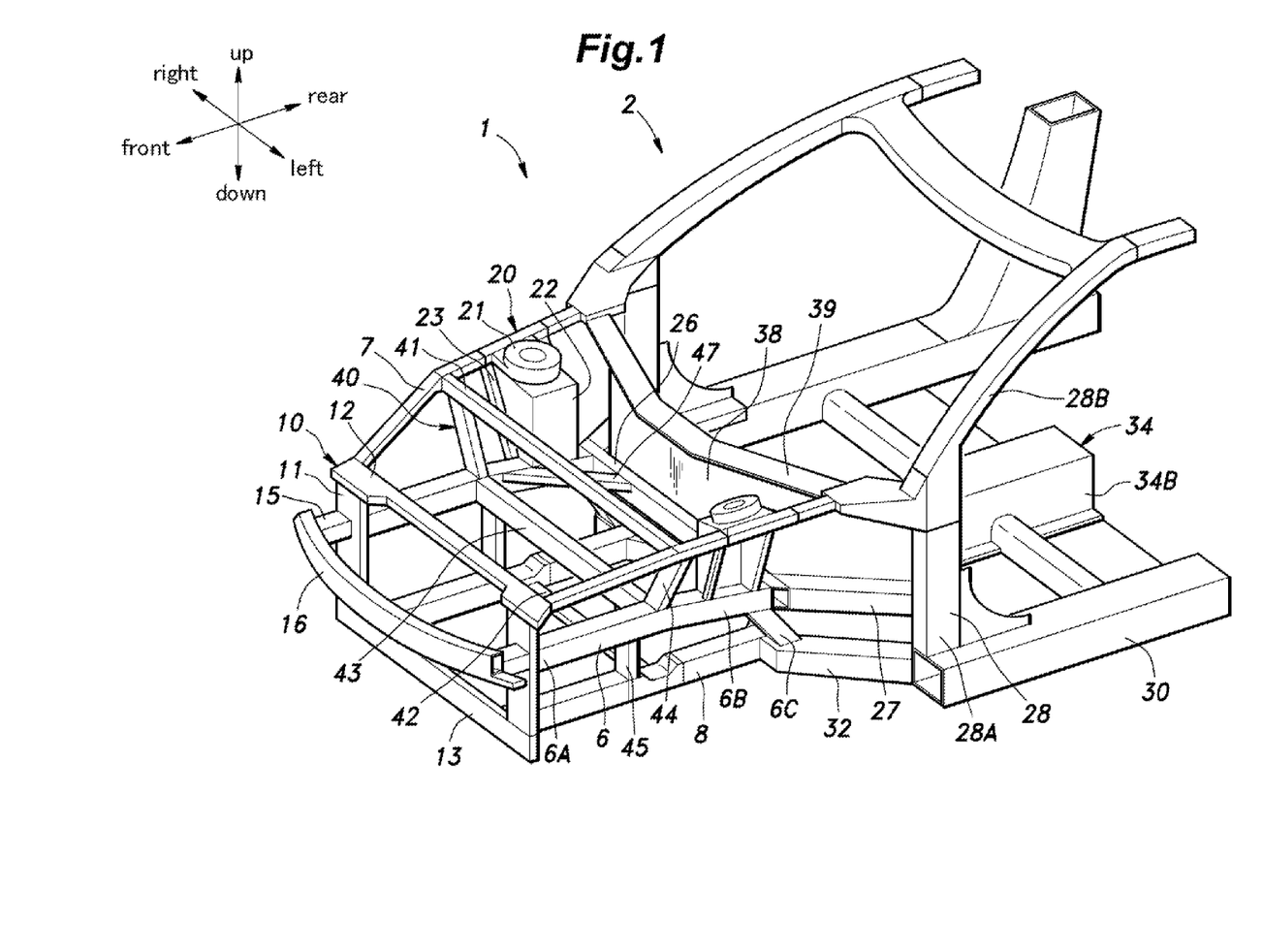
FIG. 1 is a perspective view of a front structure of a vehicle body embodying the present invention.
Figure 2:
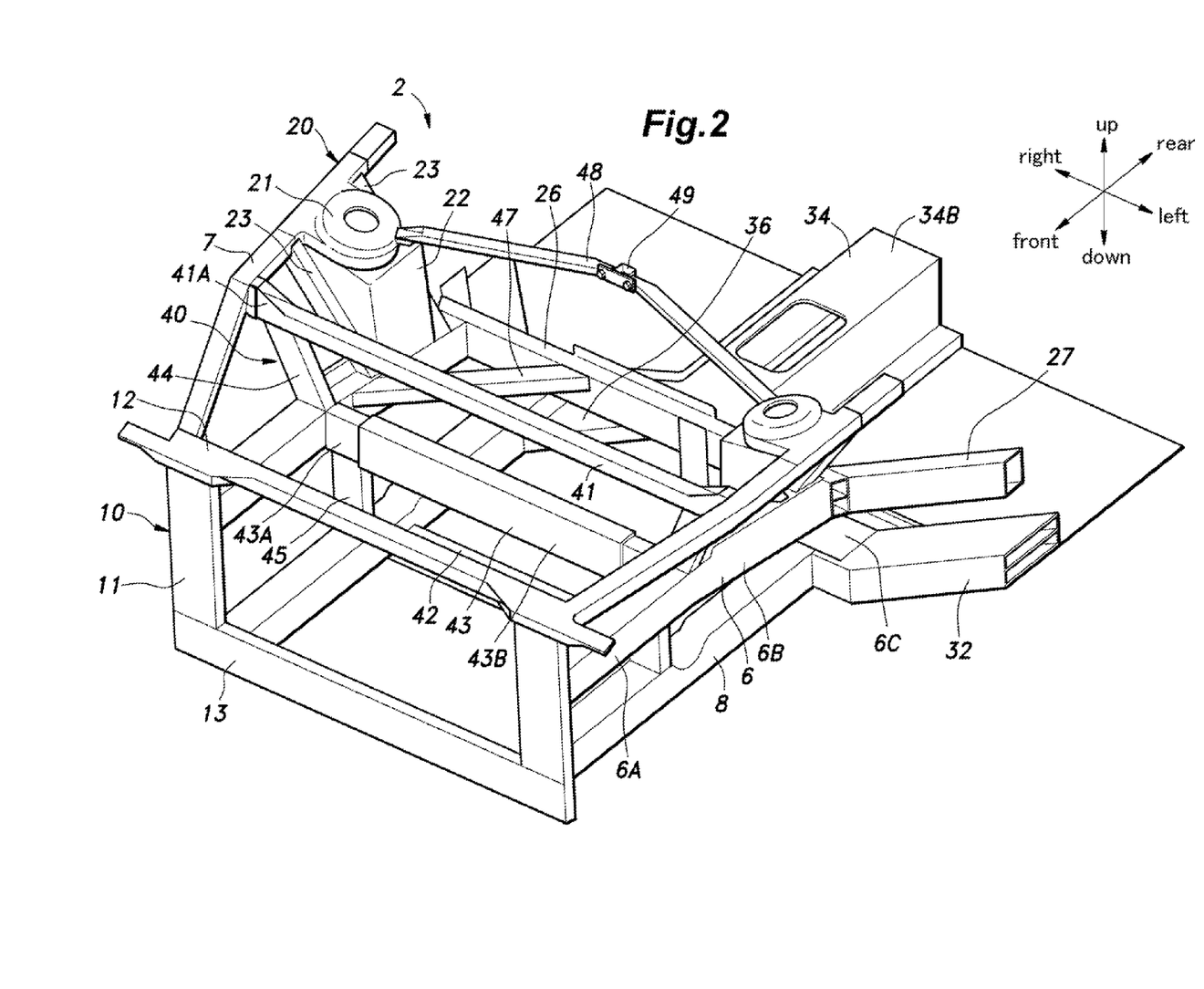
FIG. 2 is an enlarged perspective view of the front structure of the vehicle body.
Figure 3:
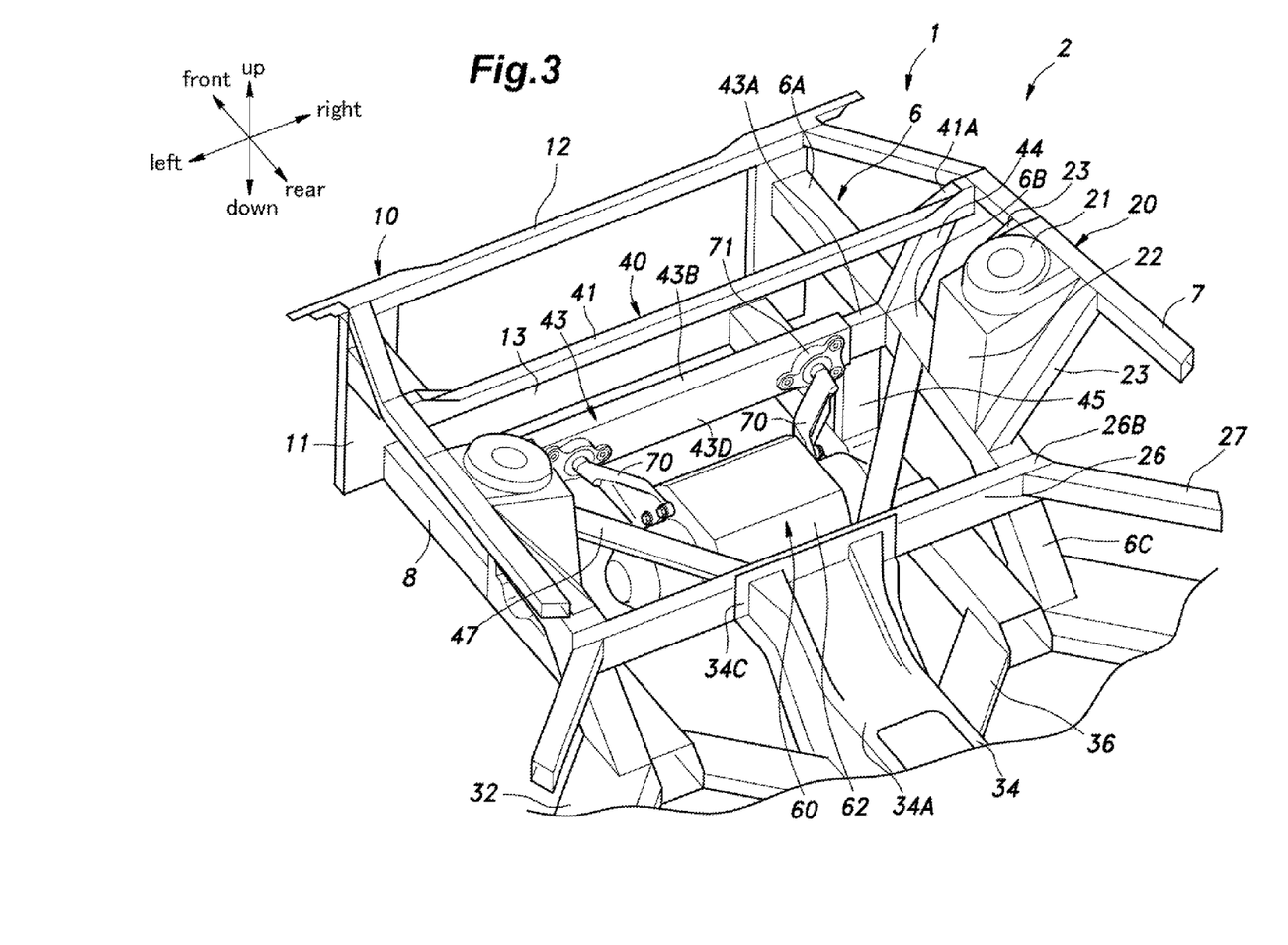
FIG. 3 is a perspective view of the front structure of the vehicle body with the electric motor mounted thereon.

FIG. 1 is a perspective view of a front structure 2 of a vehicle body 1 embodying the present invention, FIG. 2 is an enlarged perspective view of the front structure 2 of the vehicle body 1, and FIG. 3 is a perspective view of the front structure of the vehicle body with the electric motor mounted thereon. As shown in FIGS. 1 to 3, the front structure vehicle body 1 is symmetric with respect to a longitudinal center line. The front structure 2 forming a front part of the vehicle body 1 includes a pair of front side frames 6, a pair of front upper members 7 and a pair of front under frames 8, each pair extending in the fore and aft direction on either side of a front part of the vehicle body 1. Each front upper member 7 is located above and laterally outward (outboard) of the corresponding front side frame 6, and each front under frame 8 is located below and laterally inward (inboard) of the corresponding front side frame 6. The front side frames 6, the front upper members 7 and the front under frame 8 each consist of an extruded member having a closed cross section (with respect to a cross section perpendicular to the lengthwise direction). To increase the stiffness, the cross section of the extruded member may be provided with a partition wall or partition walls separating the closed cross section into a plurality of compartments.

As shown in FIG. 2, each front side frame 6 includes a front side frame front 6A extending substantially horizontally from a front-most part of the front side frame 6, a front side frame middle 6B extending rearward from the front side frame front 6A with a slight downward incline and a front side frame rear 6C extending rearward from the front side frame middle 6B with a downward curve. The front side frame front 6A, the front side frame middle 6 and the front side frame rear 6C are individually made from extruded members, and are joined together. The rear end of the front side frame front 6A and the front end of the front side frame middle 6B abut against each other at an angle and bonded to each other. The front end of the front side frame rear 6C is bonded to the lower surface of the rear end of the front side frame middle 6B so that the end surface of the rear end of the front side frame middle 6B is exposed rearwardly.

The front upper member 7 is bent in a middle part thereof as it extends in the fore and aft direction, and the front part thereof is slanted with respect to the rear part thereof in the inboard direction (toward the middle part) of the vehicle body. The front and rear parts of the front upper member 7 are made of extruded members, respectively, which are joined to each other at the middle part of the front upper member 7.

A middle part of the front under frame 8 with respect to the fore and aft direction is made of a high stiffness member such as a stamp formed member, and the front and rear parts thereof which are bonded to the corresponding ends of the middle part are made of extruded members, respectively, which are less stiff than the middle part.

As shown in FIGS. 1 and 2, the front ends of the front side frames 6, the front upper members 7 and the front under frames 8 are connected to a front bulkhead 10 formed as a rectangular frame having an opening facing the fore and aft direction. The front bulkhead 10 includes a pair of bulkhead side frames 11 each extending vertically, a bulkhead upper frame 12 extending laterally and connected to the upper ends of the bulkhead side frames 11 at either lateral end thereof and a bulkhead lower frame 13 extending laterally and connected to the lower ends of the bulkhead side frames 11 at either lateral end thereof. Each component member of the front bulkhead 10 is made of an extruded member having a rectangular closed cross section.

The front end of each front side frame 6 abuts and is bonded to the rear surface of an intermediate part of the corresponding bulkhead side frame 11 with respect to the vertical direction in a perpendicular relationship. The front end of the front upper member 7 abuts and is bonded to the rear surface of the corresponding lateral end of the bulkhead upper frame 12. The front end of each front under frame 8 is bonded to a part of the bulkhead lower frame 13 slightly offset from the corresponding end thereof in the inboard direction. As shown in FIGS. 1 to 3, the front end of each front under frame 8 is positioned laterally more inboard than the front end of the corresponding front side frame 6, and the front end of each front upper member 7 is positioned laterally more outboard than the front end of the corresponding front side frame 6.

As shown in FIG. 1, the rear end of a bumper stay 15 extending in the fore and aft direction is bonded to a vertically middle part of each bulkhead side frame 11. Each bumper stay 15 is made of an extruded member having a closed cross section, and the front end of the bumper stay 15 is bonded to a part of a laterally extending front bumper beam 16 adjacent to the corresponding lateral end thereof. The front bumper beam 16 may consist of an extruded member having a closed cross section.

As shown in FIGS. 1 to 3, a front damper housing 20 extends between each front upper member 7 and the corresponding front side frame middle 6B. The front damper housing 20 includes a dish-shaped front damper base 21 bonded to the front upper member 7, a front damper side wall 22 having a semi-cylindrical configuration and bonded to a peripheral part of the front damper base 21 at an upper end thereof and to the front side frame 6 at a lower end thereof, and a pair of linearly extending front damper reinforcement members 23 provided on the front and rear ends of the front damper side wall 22, respectively, and each bonded to the front upper member 7 at an upper end thereof and to the front side frame 6 at a lower end thereof.

The front damper base 21 is made of cast aluminum alloy. In another embodiment, the front damper base 21 is made of stamp formed steel plate. On the front damper base 21 is mounted the upper end of a damper unit (not shown in the drawings) of a front suspension system (not shown in the drawings).

The front damper side wall 22 is made of extruded aluminum alloy, and is internally provided with a plurality of partition walls extending in the lengthwise direction so as to define a plurality of compartments in the cross section. The front damper reinforcement members 23 provided one behind the other are each made of extruded aluminum alloy, and provided with a rectangular closed cross section. The front damper reinforcement members 23 provided one behind the other are each bonded to the front damper base 21 and the front damper side wall 22 at either side edge thereof.

The rear end of each front side frame middle 6B is bonded to the corresponding lateral end of a dashboard cross member 26 (second cross member). The dashboard cross member 26 is made of an extruded member having a vertically elongated rectangular closed cross section. The lower wall 26A and the upper wall 26B of the dashboard cross member 26 are substantially horizontally disposed, and a partition wall 26C is provided between the lower wall 26A and the upper wall 26B so that the closed cross section of the dashboard cross member 26 is separated into two compartments located one above the other. The rear end of each front side frame middle 6B abuts and is bonded to the front surface of the corresponding lateral end of the dashboard cross member 26.

As shown in FIGS. 1 to 3, the lateral ends of the dashboard cross member 26 are connected to the right and left front pillars 28, respectively, via the corresponding dash side members 27. The front pillars 28 are members that define the lateral ends of the passenger compartment in the front part thereof, and each includes a vertically extending front pillar lower 28A, and a front pillar upper 28B extending from the upper end of the front pillar lower 28A upward and rearward in an oblique direction. The front pillar lower 28A and the front pillar upper 28B of each front pillar 28 are each made of an extruded member having a closed cross section. Each dash side member 27 is bonded to the corresponding lateral end of the dashboard cross member 26 at the front end thereof, and extends rearward and laterally outward in a linear fashion. The rear end of each dash side member 27 is bonded to a vertically middle part of the corresponding front pillar lower 28A. The upper end of each front pillar lower 28A is bonded to the rear end of the corresponding front upper member 7.

The lower end of each front pillar lower 28A is joined to the front end of a side sill 30 extending in the fore and aft direction along the lower side part of the vehicle body 1. The side sill 30 is provided with a closed cross section. The front end of each side sill 30 is connected to the rear end of the corresponding front under frame 8 via a floor frame 32. Each floor frame 32 is made of an extruded member having a closed cross section, and has a rear end joined to the front end of the corresponding side sill 30 and a front end joined to the rear end of the front under frame 8 with the main part thereof extending from the rear to the front obliquely in the fore and aft and inboard direction. To the lengthwise middle part of each floor frame 32 is joined the rear end of the corresponding front side frame rear 6C.

As shown in FIGS. 1 to 3, a tunnel frame 34 extends in the fore and aft direction laterally in the center of the vehicle body 1 between the two side sills 30. The tunnel frame 34 consists of a tunnel frame front 34A provided in the front part thereof and a tunnel frame rear 34B provided in the rear part thereof. The tunnel frame front 34A and the tunnel frame rear 34B are each formed as a stamp formed channel member having an open end facing downward as seen in cross section. The tunnel frame rear 34B extends in the fore and aft direction, and is joined to the rear end of the tunnel frame front 34A at the front end thereof.

As shown in FIG. 3, the tunnel frame front 34A extends forward and upward from the rear end thereof, and is provided with a flange 34C facing forward in the front end thereof. To the lower surface of the front end of the tunnel frame front 34A is bonded a reinforcement plate 34D (See FIGS. 5, 8 and 9). The reinforcement plate 34D closes the open end of the channel configuration of the tunnel frame front 34A. The tunnel frame front 34A and the reinforcement plate 34D jointly form a closed cross section. The front edge of the reinforcement plate 34D projects forward beyond the flange 34C.

The flange 34C abuts and is joined to the rear surface of the laterally central part of the dashboard cross member 26, and the front end of the reinforcement plate 34D is joined to the lower surface of the laterally central part of the dashboard cross member 26 so that the front end of the tunnel frame 34 is firmly joined to the dashboard cross member 26.

The rear end of each front under frame 8 is connected to the rear end of the tunnel frame front 34A via a floor center frame 36. The floor center frame 36 is made of an extruded member having a closed cross section, and is provided on each side of the vehicle body 1. The floor center frame 36 is provided with a front end joined to the rear end of the front under frame 8 and a rear end joined to the rear end of the tunnel frame front 34A, and extends from the front end thereof in a rearward and inboard direction.

As shown in FIG. 1, a dashboard lower 38 consisting of a stamp formed plate member extends between the two front pillar lowers 28A. The dashboard lower 38 is positioned with the major plane thereof facing substantially in the fore and aft direction, and has a lower end bonded to the flange 34C of the tunnel frame front 34A, the two floor frames 32 on either side and the rear ends of the floor center frames 36 on either side, and a pair of side edges bonded to the corresponding front pillar lowers 28A. The front surface of the dashboard lower 38 is bonded to the front side frame rears 6C on either side, the dash side members 27 on either side and the dashboard cross member 26. The upper edge of the dashboard lower 38 is provided with a dashboard upper 39 consisting of a plate member extending in the forward direction.

As shown in FIGS. 1 to 3, in a position which is intermediate between the front bulkhead 10 and the front damper housings 20 is provided a front frame structure 40 which is formed into a frame by joining the front side frames 6 on either side, the front upper members 7 on either side and the front under frames 8 on either side, to each other in each instance. The front frame structure 40 includes a front upper cross member 41, a front lower cross member 42, a front middle cross member (first cross member) 43, a pair of front upper side members 44 and a pair of front lower side members 45 which are joined into a frame defining an opening facing the fore and aft direction.

The front upper cross member 41 is made of an extruded member having a rectangular closed cross section, and extends in the lateral direction. The two lateral ends of the front upper cross member 41 are each provided with a pair of extension pieces 41A so that the front and rear ends of the front upper cross member 41 protrude more upward than the main part of the front upper cross member 41. The two lateral ends of the front upper cross member 41, including the extension pieces 41A, abut and are bonded to the inner sides of the front upper members 7, respectively.

The front lower cross member 42 is made of an extruded member extending laterally and having a rectangular closed cross section elongated in the fore and aft direction. The two lateral ends of the front lower cross member 42 abut and are bonded to the inboard surfaces of the intermediate parts of the front under frames 8, respectively.

The front middle cross member 43 includes a pair of end side front middle cross members 43A, a middle side front middle cross member 43B joining the end side front middle cross members 43A to each other. The end side front middle cross members 43A and the middle side front middle cross member 43B are each made of an extruded member having a vertically elongated rectangular closed cross section.

Each end side front middle cross member 43A is internally provided with a partition wall 43E that separates the cross section vertically into two compartments. Each end side front middle cross member 43A is bonded to the inboard side surface of the corresponding front side frame middle 6, and projects inward therefrom.

The middle side front middle cross member 43B includes a front wall 43C and a rear wall 43D each extending vertically. Except for the lateral ends, the middle side front middle cross member 43B is internally provided with a partition wall 43E that separates the cross section vertically into two compartments. The partition wall 43E is absent in the two lateral ends of the middle side front middle cross member 43B so that the corresponding ends of the end side front middle cross member 43A may be received in the two lateral ends of the middle side front middle cross member 43B, respectively.

Each lateral end of the middle side front middle cross member 43B receives the corresponding end side front middle cross member 43A, and the two parts are joined to each other by joining means such as welding, SPR and bolts.

Each front upper side member 44 is made of an extruded member having a rectangular closed cross section, and has a lower end that abuts and is joined to the upper surface of the front side frame middle 6B and an upper end that abuts and is joined to the lower surface of the front upper member 7. Each front upper side member 44 extends in an upward and outboard direction from the lower end to the upper end thereof. Each front lower side member 45 is made of an extruded member having a rectangular closed cross section, and has a lower end that abuts and is joined to the upper surface of an intermediate part of the front under frame 8 and an upper end that abuts and is joined to the lower surface of the end side front middle cross member 43A, with the main part thereof extending vertically.

The front upper cross member 41, the front upper side members 44 and the front lower side members 45 are positioned so as to coincide (overlap) with one another with respect to the fore and aft direction in plan view. On the other hand, the front lower cross member 42 is offset in the rearward direction from the remaining members forming the front frame structure 40 such as the front upper cross member 41 in plan view. The opening facing the fore and aft direction defined by the front frame structure 40 is separated vertically by the front middle cross member 43 into two compartments.

As shown in FIG. 2, each front side frame 6 is connected to the dashboard cross member 26 via a first front reinforcement member 47 which extends obliquely in the manner of a brace. Each first front reinforcement member 47 is made of an extruded member having a rectangular closed cross section. The rear end of the first front reinforcement member 47 abuts and is joined to the front surface of a laterally middle part of the dashboard cross member 26 which is located immediately ahead of the tunnel frame front 34A. More specifically, the rear end of each first front reinforcement member 47 is positioned so as to correspond to the corresponding side part of the front end of the tunnel frame front 34A and be directed in the fore and aft direction. Each first front reinforcement member 47 extends linearly from the rear end thereof in a forward and outboard direction, and the front end thereof abuts and is bonded to the inboard side of a part of the corresponding front side frame middle 6B located between the front damper housing 20 and the front middle cross member 43 with respect to the fore and aft direction.

As shown in FIG. 2, each front damper base 21 is connected to a laterally middle part of the dashboard lower 38 via a second front reinforce member 48 which extends in the manner of a brace. Each second front reinforcement member 48 is made of an extruded member having a rectangular closed cross section. The rear end of each second front reinforce member 48 is joined to a bracket 49 which is bonded to a laterally middle part of the dashboard lower 38 by using threaded bolts. Each second front reinforce member 48 extends linearly from the rear end thereof in a forward and outboard direction, and is attached to a support part integrally formed with the front damper base 21 by using threaded bolts.

(Mounting Structure for the Electric Motor)

Figure 4:
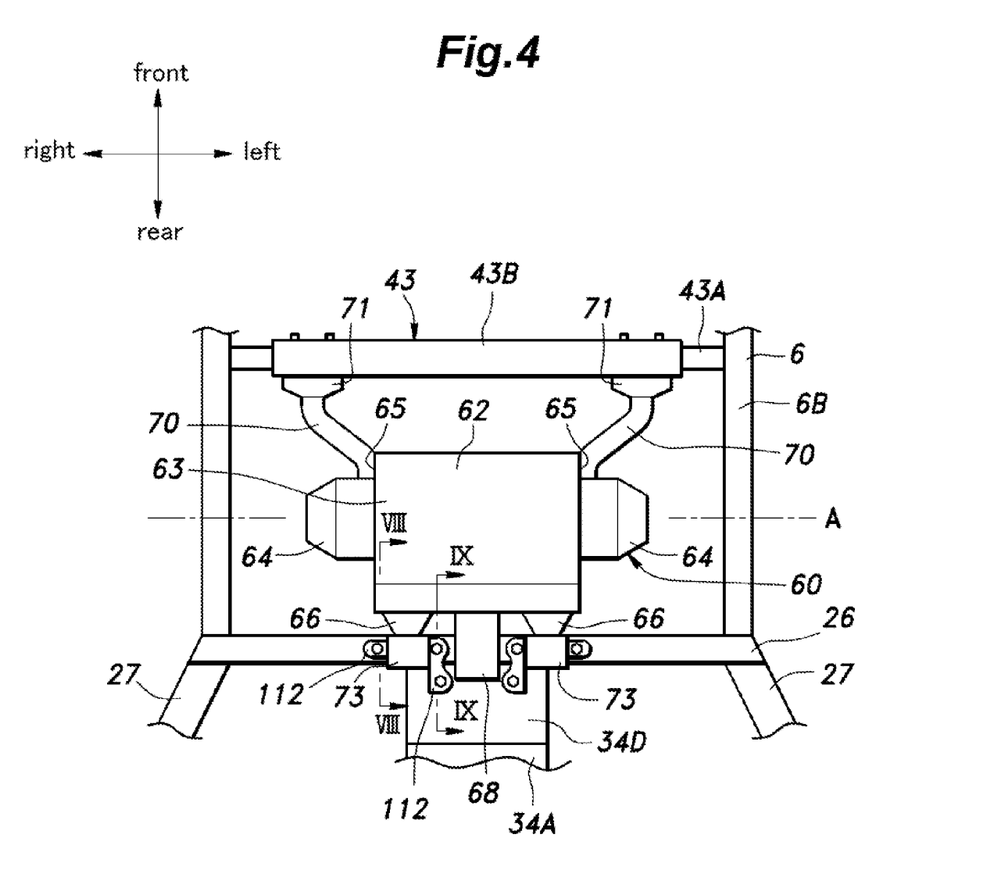
FIG. 4 is a schematic bottom view of the front structure of the vehicle body with the electric motor mounted thereon.
Figure 5:
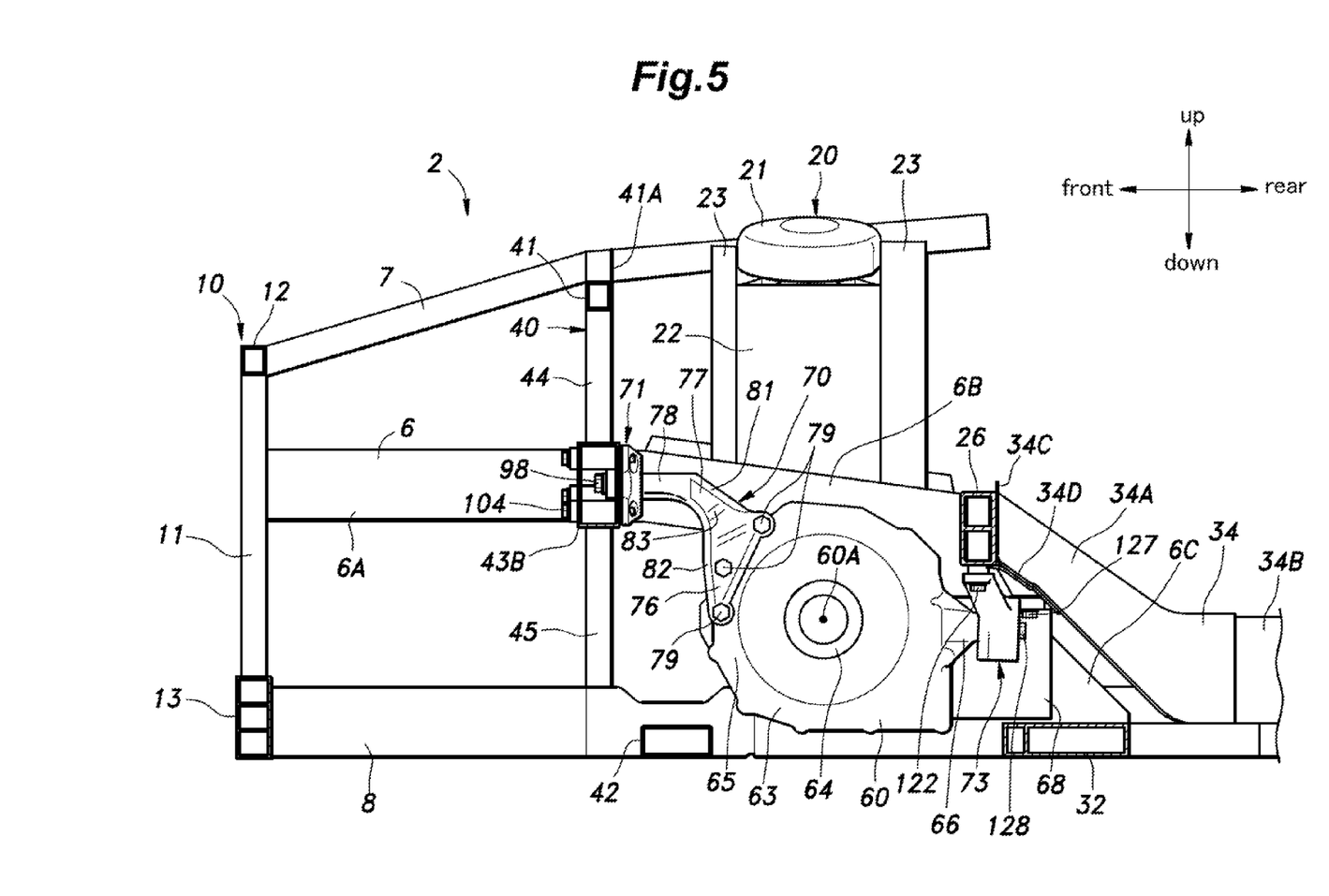
FIG. 5 is a side view of the front structure of the vehicle body with the electric motor mounted thereon.

FIG. 4 is a schematic bottom view of the front structure of the vehicle body with the electric motor mounted thereon, and FIG. 5 is a side view of the front structure of the vehicle body with the electric motor mounted thereon. As shown in FIGS. 3 to 5, the electric motor 60 used for driving the wheels is positioned on the vehicle body 1 such that the rotary shaft 60A thereof extends in the lateral direction. The housing 62 of the electric motor 60 is substantially cylindrical in shape, and includes a housing main body 63 receiving a rotor not shown in the drawings therein. The housing main body 63 is mounted on the vehicle body 1 with the axial line thereof extending laterally. The two lateral ends 64 of the housing main body 63 are each reduced in diameter in a stepwise manner as compared to the central part thereof so that a front fastening seat 65 is defined as a flat surface facing leftward on the left end part of the housing main body 63. Similarly, another front fastening seat 65 is defined as a flat surface facing rightward on the right end part of the housing main body 63. Thus, the housing main body 63 is provided with a pair of front fastening seats 65 on either lateral end thereof.

A pair of rear fastening seats 66 projecting rearward are defined on either lateral side of a rear part of the housing main body 63. Each rear fastening seat 66 provides a fastening surface facing rearward at each projecting end. A part of the housing main body 63 located between the rear fastening seats 66 is provided with a rear projection 68 which projects rearward and receives electronic components, for instance, therein.

As shown in FIG. 4, the electric motor 60 is supported by the middle side front middle cross member 43B via motor stay members 70 and corresponding front mount members 71, and by the dashboard cross member 26 and the tunnel frame front 34A via a pair of rear mount members 73.

As shown in FIGS. 4 and 5, the rotary shaft 60A of the electric motor 60 extends laterally, and is positioned between the middle side front middle cross member 43B and the dashboard cross member 26 with respect to the fore and aft direction. In particular, the rotary shaft 60A of the electric motor 60 coincides with the front damper housings 20 in the fore and aft direction.

The motor stay members 70 are metallic cast members, and each include a motor fastening portion 76 which is fastened to the front fastening seat 65 of the electric motor 60 of the corresponding side, an arm portion 77 that extends from the motor fastening portion 76 in a forward, upward and outboard direction, and a front mount fastening portion 78 provided on the front end of the arm portion 77 and fastened to the front mount member 71.

The motor fastening portion 76 is provided with a flat surface facing inboard, and makes a surface contact with the front fastening seat 65 at this flat surface. The motor fastening portion 76 is fastened to the front fastening seat 65 by a plurality (three, in the illustrated embodiment) of threaded bolts 79 which are laterally passed through the motor fastening portion 76 and threaded into respective female thread holes (not shown in the drawings) formed in the front fastening seat 65. The threaded bolts 79 are arranged along a circle centered around the rotary shaft 60A of the electric motor 60. Each threaded bolt extends laterally. The motor fastening portion 76 extends circumferentially around the electric motor 60 when fastened to the electric motor 60.

The two arm portions 77 diverge away from each other as they extend from the rear end to the front end thereof. In other words, the lateral distance between the front ends of the arm portions 77 is greater than the lateral distance between the rear ends of the arm portions 77. The vertical width of each arm portion 77 gets smaller from the rear end which continues to the motor fastening portion 76 to the front end which continues to the front mount fastening portion 78. Thus, each arm portion 77 is triangular in shape when seen from sideways as shown in FIG. 5. Each arm portion 77 is provided with an upper edge rib 81 extending in the outboard direction from the upper edge of the arm portion 77 along the upper edge thereof, a lower edge rib 82 extending in the outboard direction from the lower edge of the arm portion 77 along the lower edge thereof, and a plurality of connecting ribs 83 provided between the upper edge rib 81 and the lower edge rib 82. The upper edge rib 81, the lower edge rib 82 and the connecting ribs 83 are provided for the purpose of reducing the weight and increasing the stiffness of the arm portion 77.

Each front mount fastening portion 78 is cylindrical in shape with the axial line thereof extending in the fore and aft direction, and has a rear end that continues to the corresponding arm portion 77. The upper edge rib 81 and the lower edge rib 82 of each arm portion 77 continue to the rear end of the corresponding front mount fastening portion 78. The front end surface of each front mount fastening portion 78 is formed with a female threaded hole 86 having an axial line extending in the fore and aft direction, and has a closed bottom end.

In each motor stay member 70 constructed as described above, the front mount fastening portion 78 is positioned above and outboard of the motor fastening portion 76.

Figure 6:
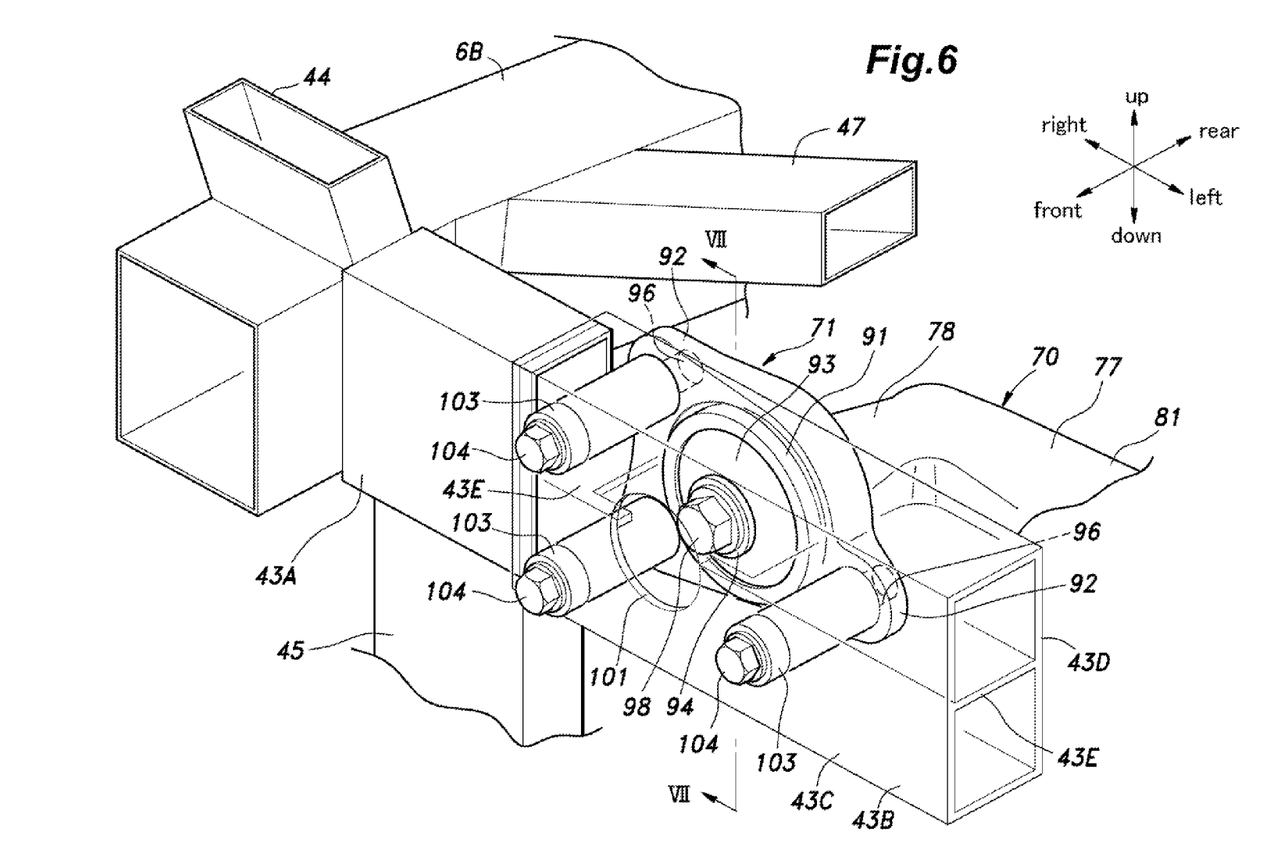
FIG. 6 is a perspective view showing a front part of the electric motor mounting structure.
Figure 7:
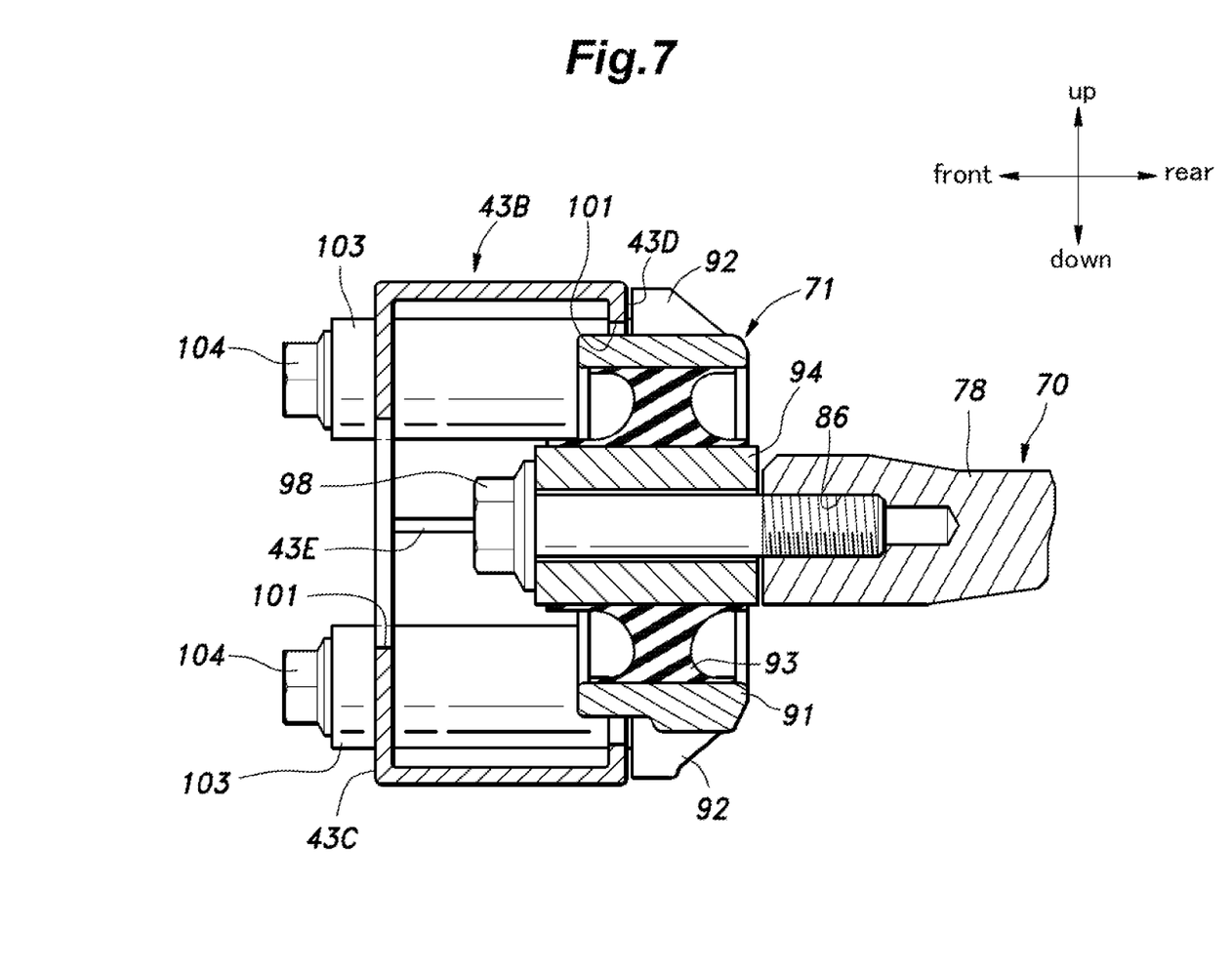
FIG. 7 is a sectional view taken along line VII-VII of FIG. 6.

FIG. 6 is a perspective view showing a front part of the electric motor mounting structure, and FIG. 7 is a sectional view taken along line VII-VII of FIG. 6. As shown in FIGS. 6 and 7, the front mount member 71 includes a front outer tube member 91 having a cylindrical shape with two open ends, at least one front fastening portion 92 projecting radially outward from the outer circumferential surface of the front outer tube member 91, an annular rubber bush 93 retained inside the front outer tube member 91, and a front inner tube member 94 having a cylindrical shape with two open ends and supported inside the front outer tube member 91 coaxially via the rubber bush 93. The front mount member 71 is mounted on the middle side front middle cross member 43B such that the axial line of the front outer tube member 91 and the front inner tube member 94 extends in the fore and aft direction.

In the illustrated embodiment, three front fastening portions 92 are provided, and each have a fastening surface facing forward. The fastening surfaces of the front fastening portions 92 are located on a common plane perpendicular to the axial line of the front outer tube member 91 and coincident with a middle point of the front outer tube member 91 with respect to the fore and aft direction. The fastening surface of each front fastening portion 92 is formed with a female threaded hole 96 passed through in the fore and aft direction. In another embodiment, the female threaded hole 96 of each front fastening portion 92 has a closed bottom.

The front inner tube member 94 is longer than the front outer tube member 91 in the axial direction (fore and aft direction), and projects beyond the front end and the rear end of the front outer tube member 9. The front inner tube member 94 and the motor stay member 70 are joined to each other by passing a threaded bolt 98 into the front inner tube member 94 from the front end thereof, and threading the threaded bolt 98 into the female threaded hole 86 of the front mount fastening portion 78 with the rear end surface of the front inner tube member 94 placed opposite to the front end surface of the front mount fastening portion 78 of the motor stay member 70.

A part of the middle side front middle cross member 43B adjacent to each lateral end thereof is formed with a receiving hole 101 having a circular cross section and passed through the rear wall 43D and the front wall 43C in a rearward direction. Each receiving hole 101 may have an inner diameter that varies depending on the position in the axial direction (the fore and aft direction). In this embodiment, the diameter of the receiving hole 101 at the rear wall 43D is greater than that at the front wall 43C. The partition wall 43E provided in the middle side front middle cross member 43B is omitted in the part that coincides with the receiving hole 101. The receiving hole 101 is dimensioned so as to receive the front outer tube member 91, preferably substantially without any play.

Each receiving hole 101 of the middle side front middle cross member 43B is surrounded by a plurality of cylindrical collars 103 that are each passed through the middle side front middle cross member 43B in the fore and aft direction. Three collars 103 are used in this embodiment. The collars 103 are positioned so as to correspond to the front fastening portion 92 of the front mount member 71. In this embodiment, the collars 103 are disposed so as to project forward from the front wall 43C of the middle side front middle cross member 43B and rearward from the rear wall 43D of the middle side front middle cross member 43B. In another embodiment, the front end surface and the rear end surface of each collar 103 are flush with the outer surfaces of the front wall 43C and the rear wall 43D of the middle side front middle cross member 43B, respectively. In another embodiment, the front end surface and the rear end surface of each collar 103 are flush with the outer surfaces of the front wall 43C and the rear wall 43D of the front cross member. Two of the collars 103 are provided on the outboard side of the receiving hole 101 or on the side of the front side frame, and the remaining collar 103 is provided on the inboard side of the receiving hole 101.

The outer tube member 91 is inserted in the receiving hole 101 from the rear of the middle side front middle cross member 43B. In this conjunction, the fastening surface of each front fastening portion 92 abuts the rear end surfaces of the collars 103 provided in the middle side front middle cross member 43B, thereby defining the depth by which the outer tube member 91 is inserted in the receiving hole 101. Each front fastening portion 92 is fastened to the corresponding collar 103 by a threaded bolt 104 passed into the collar 103 from the front end thereof and threaded into the corresponding female thread hole 96. In other words, the outer tube member 91 of the front mount member 71 is connected to the middle side front middle cross member 43B via the collars 103.

When the front fastening portions 92 are fastened to the collars 103, the front ends of the outer tube member 91 and the front inner tube member 94 are located within the receiving hole 101. In other words, the front ends of the outer tube member 91 and the front inner tube member 94 are located within the closed cross section defined by the middle side front middle cross member 43B. The positions of the front ends of the outer tube member 91 and the front inner tube member 94 can be adjusted by changing the axial lengths of the outer tube member 91 and the front inner tube member 94 and/or the position of the front fastening portion 92 relative to the outer tube member 91. For instance, the front end of the outer tube member 91 may reach the front wall 43C of the middle side front middle cross member 43B, or may protrude beyond the front wall 43C. The front end of the outer tube member 91 may be bonded to the front wall 43C of the middle side front middle cross member 43B.

Because the receiving hole 101 is passed through the middle side front middle cross member 43B in the fore and aft direction, when the front mount member 71 is positioned on the middle side front middle cross member 43B, the front inner tube member 94 passes completely through the receiving hole 101, and is exposed in the front end. Therefore, the threaded bolt 98 for securing the front inner tube member 94 and the motor stay member 70 together can be passed through the receiving hole 101. As a result, the threaded bolts 98 for securing the front inner tube member 94 and the motor stay member 70 to each other and the threaded bolt 104 for securing each collar 103 to the front fastening portion 92 can be fastened from the same direction (the same threading direction), and this facilitates the assembly work.

Figure 8:
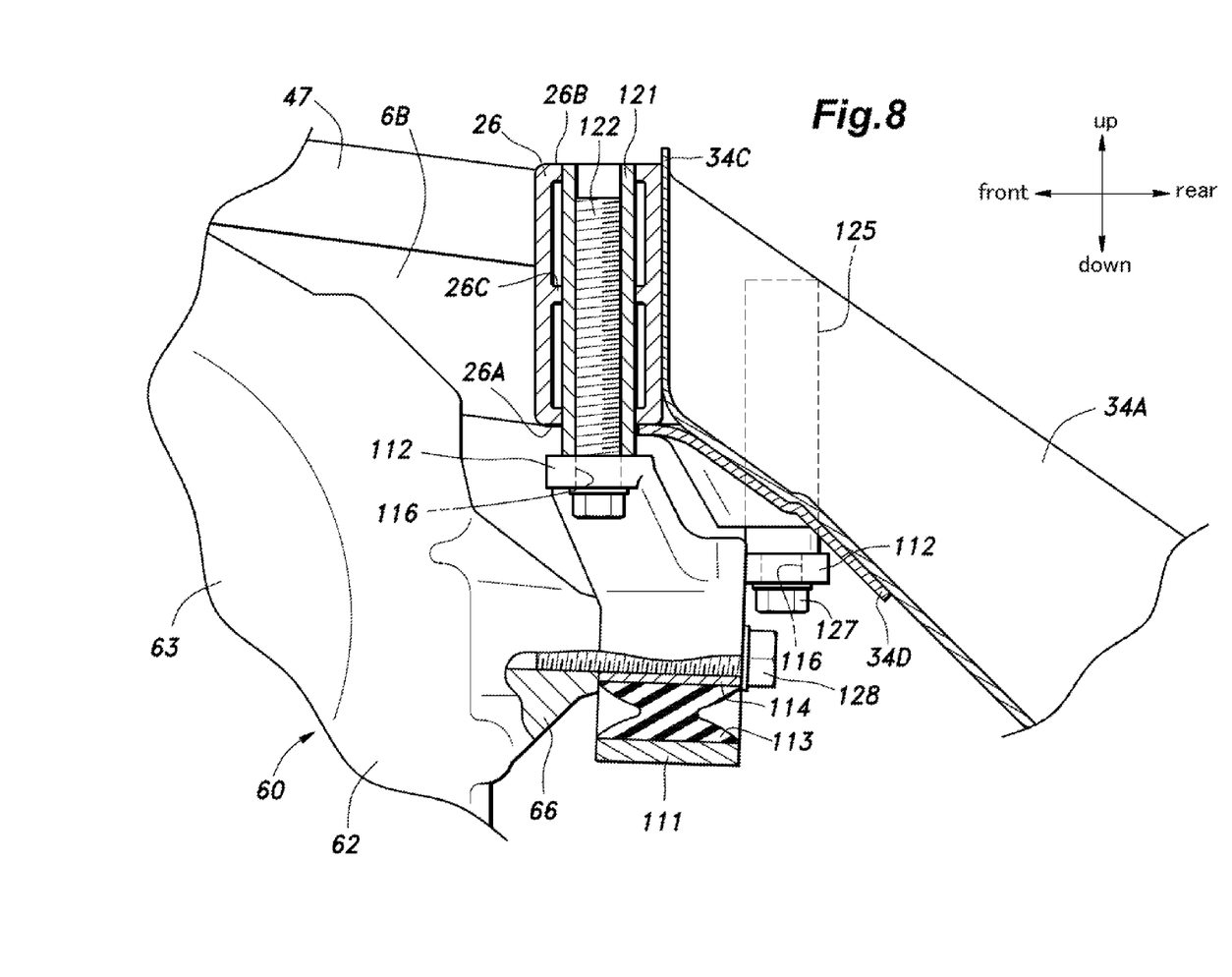
FIG. 8 is a sectional view (taken along line VIII-VIII of FIG. 4) showing a rear part of the electric motor mounting structure.
Figure 9:
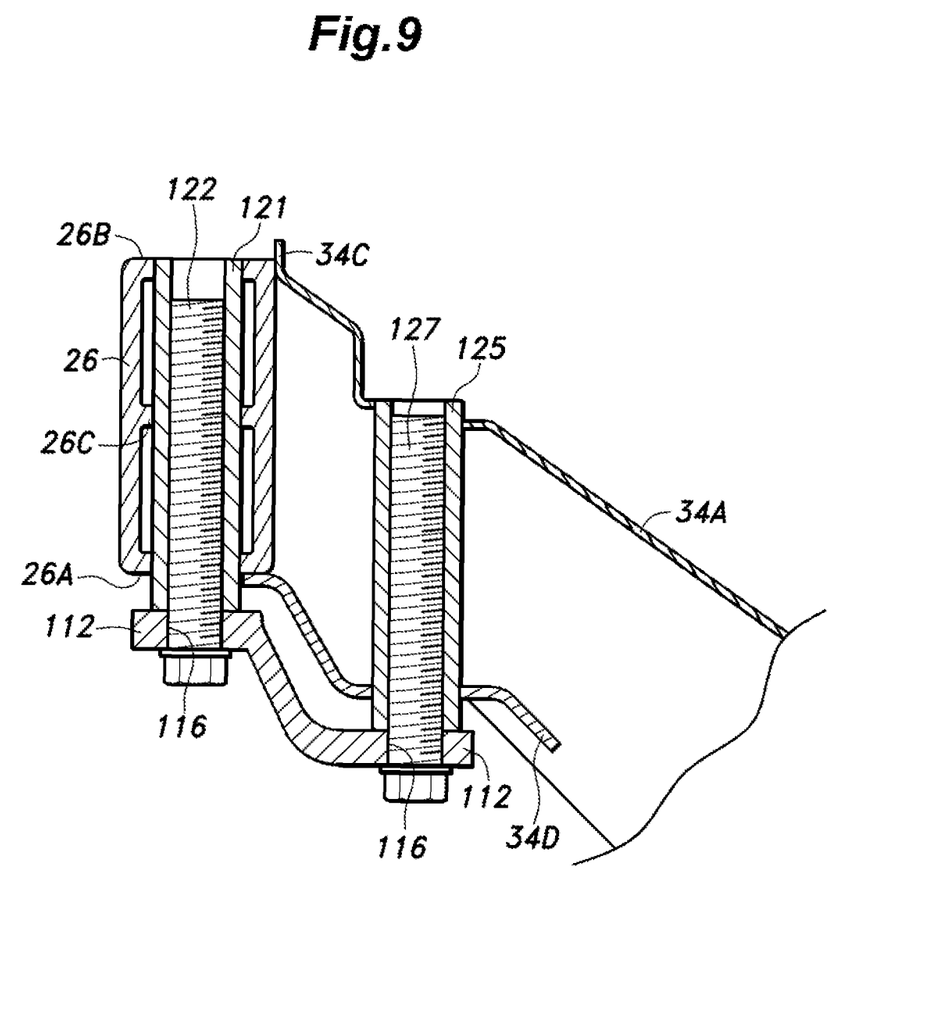
FIG. 9 is a sectional view (taken along line IX-IX of FIG. 4) showing a rear part of the electric motor mounting structure.

FIG. 8 is a sectional view (taken along line VIII-VIII of FIG. 4) showing a rear part of the electric motor mounting structure, and FIG. 9 is a sectional view (taken along line IX-IX of FIG. 4) showing a rear part of the electric motor mounting structure. As shown in FIGS. 8 and 9, the rear mount member 73 includes a rear outer tube member 111 having a cylindrical shape with two open ends, at least one rear fastening portion 112 radially projecting from the outer circumferential surface of the rear outer tube member 111, an annular rubber bush 113 retained inside the rear outer tube member 111 and a rear inner tube member 114 having a cylindrical shape with two open ends and supported inside the rear outer tube member 111 coaxially via the rubber bush 113. The rear mount member 73 is mounted on the dashboard cross member 26 and the tunnel frame front 34A such that the axial lines of the rear outer tube member 111 and the rear inner tube member 114 extend in the fore and aft direction.

As shown in FIGS. 4, 8 and 9, each rear mount member 73 is provided with three rear fastening portions 112 each provided with an upwardly facing fastening surface. The axial line extending perpendicularly to the fastening surface of each rear fastening portion 112 is perpendicular to the axial line of the corresponding rear outer tube member 111. The rear outer tube members 111 are positioned under the dashboard cross member 26 so as to correspond to either lateral end of the tunnel frame front 34A with the axial lines thereof extending in the fore and aft direction. Two of the three rear fastening portions 112 of each rear outer tube member 111 are positioned laterally inboard of the axial lines of the rear outer tube member 111 extending in the fore and aft direction, and the remaining rear fastening portion 112 is positioned laterally outboard of the axial line of the rear outer tube member 111. The two rear fastening portions 112 that are positioned inboard of the axial line of the rear outer tube member 111 are arranged one behind the other such that the front rear fastening portion 112 opposes the lower wall 26A of the dashboard cross member 26, and the rear fastening portion 112 opposes the tunnel frame front 34A. The fastening surface of each rear fastening portion 112 is provided with a vertically extending through hole 116.

As shown in FIGS. 8 and 9, to the part of the dashboard cross member 26 opposing each corresponding rear fastening portion 112 is attached a first nut member 121 that extends vertically through the dashboard cross member 26 by welding or the like. Each first nut member 121 is provided with a cylindrical shape with a vertically extending axial line. The inner surface of each first nut member 121 is formed with a female thread. Each first nut member 121 is disposed such that the upper end thereof is flush with the outer surface of the upper wall 26B of the dashboard cross member 26, and the lower end thereof projects downward from the lower wall of the dashboard cross member 26. The two rear fastening portions 112 positioned under the dashboard cross member 26 abut the lower parts of the opposing first nut members 121, respectively. In this condition, threaded bolts 122 are passed through the two through holes 116 provided in the rear fastening portions 112 from below, and threaded into the corresponding first nut members 121 so that the two rear fastening portions 112 are fastened to the corresponding first nut members 121.

As shown in FIG. 9, in the part of the tunnel frame front 34A opposing the rear fastening portion 112, a second nut member 125 is passed vertically through the reinforcement plate 34D and the tunnel frame front 34A, and is bonded to the reinforcement plate 34D and the tunnel frame front 34A. The second nut member 125 is provided with a cylindrical shape with a vertically extending axial line. The inner surface of the second nut member 125 is formed with a female thread. The second nut member 125 is positioned such that the upper end thereof is flush with the upper surface of the tunnel frame front 34A, and the lower end thereof projects downward from the lower surface of the reinforcement plate 34D. In other words, the second nut member 125 is passed vertically across the tunnel frame front 34A and the reinforcement plate 34D. The rear fastening portion 112 is positioned under the tunnel frame front 34A so as to abut the lower end of the opposing second nut member 125. In this condition, a bolt 127 is passed through the through hole 116 of the rear fastening portion 112 from below, and is threaded into the second nut member 125 so that the rear fastening portion 112 is fastened to the second nut member 125.

The rear outer tube member 111 of the rear mount member 73 is fastened to the dashboard cross member 26 via the two rear fastening portions 112 and the corresponding first nut members 121, and to the tunnel frame front 34A via the rear fastening portion 112 and the corresponding second nut member 125.

The rear inner tube member 114 of each rear mount member 73 has a substantially same axial length as the rear outer tube member 111, and the front end surface thereof is substantially coincidental to the front end surface of the rear outer tube member 111 with respect to the fore and aft direction. The front end surface of the rear inner tube member 114 opposes the corresponding rear fastening seat 66 of the electric motor 60. A threaded bolt 128 is passed through the inner bore of the rear inner tube member 114 from the rear to the front, and is threaded into the female threaded hole 129 with a closed bottom formed in the rear fastening seat 66 so that the rear inner tube member 114 is fastened to the rear fastening seat 66.

In this mounting structure for the electric motor 60, the rotary shaft 60A of the electric motor 60 is located below the middle side front middle cross member 43B and the dashboard cross member 26, and above the front lower cross member 42. As shown in FIG. 5, the position of the electric motor 60 is selected such that an imaginary line A connecting the center of the front mount member 71 (more specifically, the center of the front inner tube members 94) and the center of the rear mount member 73 (more specifically, the center of the rear inner tube members 114) passes through the housing 62 of the electric motor 60 as viewed in the lateral direction. Owing to the proximity of the imaginary line A to the rotary shaft 60A of the electric motor 60, the mounting stiffness of the electric motor 60 against the rotational moment around a motor rotation axis A is improved.

Because the two motor stay members 70 laterally diverge away from each other toward the front ends thereof, the distance between the rear mount members 73 is increased, and this improves the stability of the electric motor 60. Because the lateral ends of the front middle cross member 43 are bonded to the front side frame middles 6B on either side, the lateral ends are given with a particularly high stiffness. In other words, owing to the increased distance between the rear mount members 73, each front mount member 71 is allowed to be positioned in a part of the middle side front middle cross member 43B having a relatively high stiffness so that mounting stiffness of the electric motor can be improved.

Because the rear end of each motor stay member 70 which is fastened to the electric motor 60 is displaced downward with respect to the front end thereof, the electric motor 60 can be placed lower than the middle side front middle cross member 43B, the front side frame middle 6B and the dashboard cross member 26 without any risk of interfering with such components.

Because the rear projection 68 which is a part of the housing 62 of the electric motor 60 is placed below the tunnel frame front 34A, a part of the electric motor 60 can be received in a space defined under the tunnel frame front 34A which extends obliquely upward, and an efficient utilization of space can be achieved.

Because each front mount member 71 is configured such that the front ends of the front outer tube member 91 and the front inner tube member 94 are fitted into the cross section (inner bore) of the middle side front middle cross member 43B, the overlap between the front mount member 71 and the middle side front middle cross member 43B can be maximized so that the stiffness of the bonded part can be increased. Also, the front outer tube member 91 and the front inner tube member 94 are permitted to be elongated to such an extent that the stability in supporting the front inner tube member 94 with the front outer tube member 91 can be improved.

The preferred embodiment of the present invention has been described, but the present invention is not limited by the specific embodiment, but may be modified and varied without departing from the spirit of the present invention. Each front mount member 71 was bonded to the middle side front middle cross member 43B from the side of the rear wall 43D in the illustrated embodiment, but the front mount member 71 may also be bonded to the middle side front middle cross member 43B from the side of the lower wall. The housing 62 of the electric motor 60 was attached to each front mount member 71 via the corresponding motor stay member 70 in the illustrated embodiment, but it is also possible to omit the motor stay members 70, and directly join the front inner tube member 94 of each front mount member 71 to the housing 62 of the electric motor 60.

The foregoing embodiment of the electric motor mounting structure was directed to an example where the electric motor is used for driving the front wheels, but the electric motor mounting structure of the present invention may also be applied to an electric motor for driving rear wheels. For instance, an electric motor mounting structure similar to that of the illustrated embodiment may be implemented in a vehicle body rear structure having a pair of rear frames (side members) on either side of a rear part of a vehicle body by providing a pair of laterally extending cross members one behind the other to be connected to the rear frames on either side to each other, and providing a front mount members and a rear mount members on the cross members provided one behind the other, respectively.

GLOSSARY

1 - - - vehicle body, 6 - - - front side frame (side member), 7 - - - front upper member, 8 - - - front under frame, 10 - - - front bulkhead, 20 - - - front damper housing, 26 - - - dashboard cross member (second cross member), 27 - - - dash side member, 30 - - - side sill, 34 - - - tunnel frame, 34A - - - tunnel frame front, 34D - - - reinforcement plate, 40 - - - front frame structure, 41 - - - front upper cross member, 42 - - - front lower cross member, 43 - - - front middle cross member (first cross member), 43A - - - end side front middle cross member, 43B - - - middle side front middle cross member, 44 - - - front upper side member, 45 - - - front lower side member, 60 - - - electric motor, 60 - - - electric motor, 60A - - - rotary shaft, 62 - - - housing, 63 - - - housing main body, 65 - - - front fastening seat, 66 - - - rear fastening seat, 70 - - - motor stay member, 71 - - - front mount member (first mount member), 73 - - - rear mount member (second mount member), 76 - - - motor fastening portion, 77 - - - arm portion, 78 - - - front mount fastening portion, 91 - - - front outer tube member (first outer tube member), 92 - - - front fastening portion (first fastening portion), 93 - - - rubber bush, 94 - - - front inner tube member (first inner tube member), 101 - - - receiving hole, 103 - - - collar, 111 - - - rear outer tube member (second outer tube member), 112 - - - rear fastening portion (second fastening portion), 113 - - - rubber bush, 114 - - - rear inner tube member (second inner tube member), 121 - - - first nut member, 125 - - - second nut member, A - - - imaginary line

The invention claimed is:

1. An electric motor mounting structure for mounting an electric motor for driving a wheel on a vehicle body formed by combining a plurality of frame members, wherein:

the frame members include a pair of side members extending in a fore and aft direction on either side, a first cross member extending laterally and joined to the side members, and a second cross member extending laterally behind the first cross member;

the electric motor is provided with a rotary shaft extending laterally and located between the first cross member and the second cross member with respect to the fore and aft direction;

a front part of the electric motor is joined to a pair of motor stay members that extend forward while diverging away from each other laterally, and a front end of each motor stay member is supported by the first cross member via a first mount member;

a rear part of the electric motor is supported by the second cross member via a second mount member;

the first mount member includes a first outer tube member partly received by a receiving hole provided to the first cross member, a first fastening portion projecting from an outer surface of the first outer tube member and fastened to the first cross member at a part thereof outside of the receiving hole by a first threaded bolt, and a first inner tube member retained inside the first outer tube member via a rubber member and joined to the motor stay member; and a collar for receiving and supporting the first threaded bolt is joined to the first cross member.

2. The electric motor mounting structure according to claim 1, wherein the first inner tube member is joined to the motor stay member by a second threaded bolt, and the receiving hole consists of a through hole, the first and second threaded bolts having a same threading direction.

3. The electric motor mounting structure according to claim 1, wherein the second mount member includes a second inner tube member supporting the electric motor, a second outer tube member receiving the second inner tube member via a rubber member, and a second fastening portion projecting from an outer surface of the second outer tube member and fastened to the second cross member by a third threaded bolt, the third threaded bolt having an axial line substantially perpendicular to an axial line of the second inner tube member, and the second mount member is fastened to the second cross member by passing the third threaded bolt therethrough from below.

4. The electric motor mounting structure according to claim 1, wherein a tunnel frame extending in the fore and aft direction with an upward slant toward a front end thereof is joined to a rear part of the second cross member at the front end thereof, and the second fastening portion is fastened to the tunnel frame by a fourth threaded bolt.

5. The electric motor mounting structure according to claim 1, wherein at least three said first fastening portions are provided, and at least two of the first fastening portions are provided on one side of the center of the first outer tube member adjoining the corresponding side member.

6. The electric motor mounting structure according to claim 1, wherein an imaginary line connecting the first mount member and the second mount member passes through a housing of the electric motor as viewed in a lateral direction.

\* \* \* \* \*